United States Patent
Vasquez et al.

(10) Patent No.: US 8,442,191 B1
(45) Date of Patent: May 14, 2013

(54) MODIFYING VOICE MESSAGES STORED IN A VOICEMAIL SYSTEM

(75) Inventors: Juan Vasquez, San Jose, CA (US); Harkishin Nachnani, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/494,218

(22) Filed: Jun. 12, 2012

(51) Int. Cl.
*H04M 1/64* (2006.01)

(52) U.S. Cl.
USPC ............... 379/88.22; 379/88.19; 379/265.01

(58) Field of Classification Search ............... 379/88.19, 379/207.15, 266.01, 265.01, 88.22
See application file for complete search history.

(56) References Cited

U.S. PATENT DOCUMENTS

| | | | |
|---|---|---|---|
| 6,035,031 A | 3/2000 | Silverman | |
| 6,999,572 B1 | 2/2006 | Shaffer et al. | |
| 7,542,558 B2 | 6/2009 | Klein et al. | |
| 7,688,958 B2 | 3/2010 | Dolan et al. | |
| 7,769,144 B2 | 8/2010 | Yao et al. | |
| 7,822,188 B1 | 10/2010 | Kirchhoff et al. | |
| 8,000,455 B1 | 8/2011 | Van Haaften et al. | |
| 8,000,461 B2 | 8/2011 | Holder et al. | |
| 2005/0069095 A1* | 3/2005 | Fellenstein et al. | 379/88.02 |
| 2007/0004382 A1 | 1/2007 | Haukilahti | |
| 2010/0080365 A1 | 4/2010 | Seetharaman et al. | |

\* cited by examiner

*Primary Examiner* — Gerald Gauthier
*Assistant Examiner* — Simon King
(74) *Attorney, Agent, or Firm* — Leydig, Voit & Mayer, Ltd.

(57) ABSTRACT

A method for removing voice messages in a voicemail system queue. The method includes acquiring data associated with a first call, including a voice message provided during the first call and a unique identifier assigned to the voice message of the first call. The method also includes receiving a second call and acquiring data for the second call, the data including information indicating whether the second call relates to a voice message previously provided to the voicemail system. The method also includes determining if the second call is related to the first call based on a comparison of at least a portion of the data for the second call and at least a portion of the data for the first call. The method also includes modifying the stored data associated with the first call if the second call is determined to be related to the first call.

17 Claims, 5 Drawing Sheets

MODIFYING VOICE MESSAGES STORED IN A VOICEMAIL SYSTEM

BACKGROUND

Large organizations typically employ telecommunication systems that both receive and route calls to intended recipients. These systems also include a voicemail system that records a caller's voice message when the recipient is unavailable to answer the call. The message is routed to the recipient to be played at a later time when the recipient is available. In some instances, callers call back and leave additional messages regarding the same topic.

SUMMARY

One implementation is a voicemail system that includes one or more processors and a memory. The memory includes executable code representing instructions that when executed cause the system to receive a first call and acquire data associated with the first call. The data includes a voice message provided during the first call, the voice message stored for subsequent retrieval in a voicemail system queue with one or more additional voice messages. The data also includes a unique identifier assigned to the stored voice message of the first call. The memory also includes executable code representing instructions that when executed cause the system to receive a second call and acquire data for the second call, the data including information the system uses to determine whether the second call relates to a voice message previously provided to the voicemail system. The memory also includes executable code representing instructions that when executed cause the system to determine that the second call is related to the first call based on a comparison of at least a portion of the data for the second call and at least a portion of the data for the first call and modify the stored data associated with the first call.

In some implementations, the memory includes code representing instructions that when executed cause the system to ask the second call caller to input the unique identifier of a previously stored voice message if the second call caller provides an indication that the second call relates to a voice message previously provided to the voicemail system. In some implementations, the memory includes code representing instructions that when executed cause the system to provide the second call caller with options for modifying the stored data associated with the first call if the unique identifier input by the second call caller matches the unique identifier assigned to the stored voice message of the first call. In some implementations, the memory includes code representing instructions that when executed cause the system to provide the second caller with one or more of the following options to modify the stored data associated with the first call: delete voice message for the first call; or append an additional voice message to the data associated with the first call.

In some implementations, acquiring data for the second call includes acquiring caller identification data associated with the second call caller and asking the second call caller to provide an indication of whether the second call relates to a stored voice message. In some implementations, the memory includes code representing instructions that when executed cause the system to provide the second call caller with options for modifying the stored data associated with the first call if the caller identification data associated with the second call matches caller identification data associated with the first call.

In some implementations, the memory includes code representing instructions that when executed cause the system to perform one or more of the following actions if the second call is determined to be related to the first call: direct the second call and the voice message to an agent; direct the voice message of the first call to a different agent than the voice message of the first call was originally directed, or increase a priority level assigned to the voice message of the first call. In some implementations, the memory includes code representing instructions that when executed cause the system to direct the second call to an agent, direct the second call to a caller queue, or acquire data associated with the second call if the second call caller provides an indication the second call is not related to a voice message previously provided to the voicemail system.

In some implementations, the data associated with the second call includes: a voice message provided during the second call, the voice message stored for subsequent retrieval in the voicemail system queue with one or more additional voice messages, and a unique identifier assigned to the stored voice message of the second call. In some implementations, the data acquired that is associated with the first call includes one or more of the following: the first call caller telephone number, a caller identification associated with the first call caller, a textual representation of the voice message of the first call. In some implementations, the memory includes code representing instructions that when executed cause the system to request the second call caller to provide an indication of whether the second call relates to a voice message previously provided to the voicemail system.

Another implementation is a computer implemented method for modifying voice messages located in a voicemail system queue. The method includes receiving a first call and acquiring data associated with the first call. The data includes a voice message provided during the first call, the voice message stored for subsequent retrieval in a voicemail system queue with one or more additional voice messages, and a unique identifier assigned to the stored voice message of the first call. The method includes receiving a second call and acquiring data for the second call, the data including information used to determine whether the second call relates to a voice message previously provided to the voicemail system. The method includes determining that the second call is related to the first call based on a comparison of at least a portion of the data for the second call and at least a portion of the data for the first call. The method includes modifying the stored data associated with the first call.

In some implementations, the method also includes asking the second call caller to input the unique identifier of a previously stored voice message if the second call caller provides an indication that the second call relates to a voice message previously provided to the voicemail system. In some implementations, the method also includes providing the second call caller with options for modifying the stored data associated with the first call if the unique identifier input by the second call caller matches the unique identifier assigned to the stored voice message of the first call.

In some implementations, the method also includes providing the second caller with one or more of the following options to modify the stored data associated with the first call: delete voice message for the first call; or append an additional voice message to the data associated with the first call. In some implementations, acquiring data for the second call includes acquiring caller identification data associated with the second call caller and the method further comprising asking the second call caller to provide an indication of whether the second call relates to a stored voice message.

In some implementations, the method also includes providing the second call caller with options for modifying the stored data associated with the first call if the caller identification data associated with the second call matches caller identification data associated with the first call. In some implementations, the method also includes performing one or more of the following actions if the second call is determined to be related to the first call: direct the second call and the voice message to an agent; direct the voice message of the first call to a different agent that the voice message of the first call was originally directed, or increase a priority level assigned to the voice message of the first call.

In some implementations, the method also includes directing the second call to an agent, directing the second call to a caller queue, or acquiring data associated with the second call if the second call caller provides an indication the second call is not related to a voice message previously provided to the voicemail system. In some implementations, the data associated with the second call includes: a voice message provided during the second call, the voice message stored for subsequent retrieval in the voicemail system queue with one or more additional voice messages, and a unique identifier assigned to the stored voice message of the second call.

In some implementations, the data acquired that is associated with the first call includes one or more of the following: the first call caller telephone number, a caller identification associated with the first call caller, a textual representation of the voice message of the first call. In some implementations, the voicemail system generates the unique identifier assigned to the stored voice message of the first call and provides the unique identifier to the first call caller. In some implementations, the voicemail system issues a request to the user to input the unique identifier that is assigned to the stored voice message of the first call.

Another implementation is a computer program product, tangibly embodied in a computer readable storage medium. The computer program product includes instructions being operable to cause a data processing apparatus to modify voice messages located in a voicemail system queue by receiving a first call and acquiring data associated with the first call. The data includes a voice message provided during the first call, the voice message stored for subsequent retrieval in a voicemail system queue with one or more additional voice messages, and a unique identifier assigned to the stored voice message of the first call. The computer program product includes instructions being operable to cause a data processing apparatus to modify voice messages located in the voicemail system queue by receiving a second call and acquiring data for the second call. The computer program product includes instructions being operable to cause a data processing apparatus to modify voice messages located in the voicemail system queue by determining that the second call is related to the first call based on a comparison of at least a portion of the data for the second call and at least a portion of the data for the first call and modifying the stored data associated with the first call.

In some implementations, acquiring data for the second call includes requesting the second call caller to provide an indication whether the second call relates to a voice message previously provided to the voicemail system. In some implementations, computer program product includes instructions being operable to cause a data processing apparatus to modify voice messages located in the voicemail system queue by providing the second call caller with options for modifying the stored data associated with the first call if the unique identifier input by the second call caller matches the unique identifier assigned to the stored voice message of the first call.

In some implementations, the second call caller is provided with one or more of the following options to modify the stored data associated with the first call: delete voice message for the first call; append an additional voice message to the data associated with the first call, direct the voice message to a different agent, or increase a priority level assigned to the voice message of the first call.

The voicemail messaging methods and systems described herein (hereinafter "technology") can provide one or more of the following advantages. One advantage of the technology is that it allows a caller to update a voice message left for a recipient if the caller calls back prior to the recipient listening to the voice message. Another advantage of the technology is that by being able to modify a previously stored voice message, the technology improves the efficiency of the recipient in addressing an issue raised by the caller by eliminating the multiple voice messages that would otherwise be recorded regarding the same issue. Another advantage of the technology is that voice messages delivered to a recipient provide a complete history of the caller's issues when the recipient is finally available to handle the matter.

Other aspects and advantages of the current disclosure will become apparent from the following detailed description, taken in conjunction with the accompanying drawings, illustrating the principles of the disclosure by way of example only.

BRIEF DESCRIPTION OF THE DRAWINGS

The foregoing features of various implementations of the disclosure will be more readily understood by reference to the following detailed descriptions in the accompanying drawings, in which.

DETAILED DESCRIPTION OF ILLUSTRATIVE IMPLEMENTATIONS

Large organizations typically employ telecommunication systems that both receive and route calls to intended recipients. These systems also include a voicemail system that records a caller's voice message when the recipient is unavailable to answer the call. The message is routed to the recipient to be played at a later time when the recipient is available. In some instances, callers call back and leave additional messages regarding the same topic if offered the opportunity. In these instances, the caller may have additional information regarding the issue or the caller's urgency in attending to the issue may have changed. The caller may be providing additional details or may just be expressing frustration that an agent has not yet returned a call in response to the first voice message. This creates multiple voice messages in the system which creates confusion and/or inefficiency for the agents in handling the caller's issue.

Figure 1:
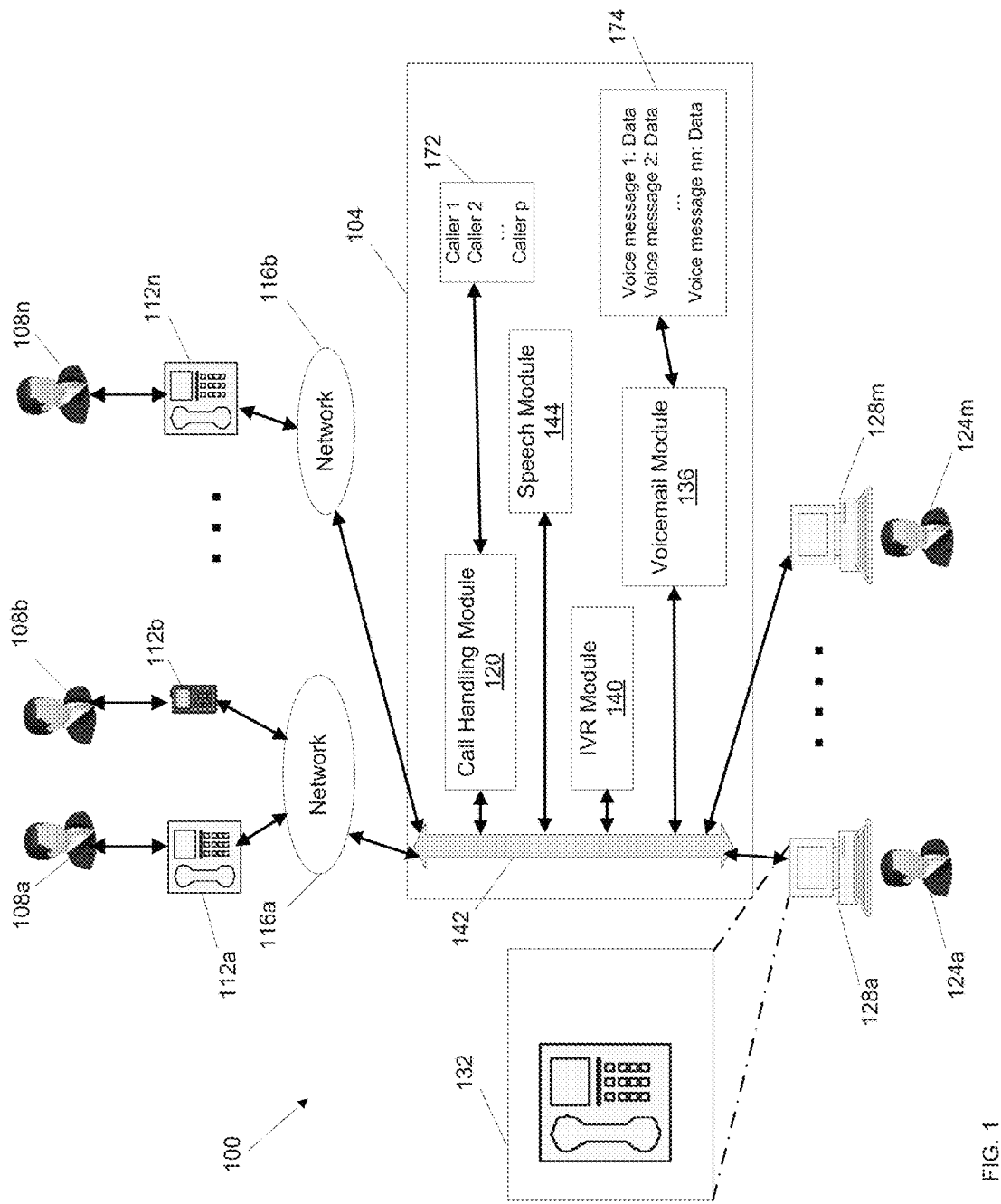
FIG. 1 is a schematic illustration of a telecommunication system environment, according to an illustrative embodiment.

FIG. 1 is a schematic illustration of a telecommunication system environment 100 useful in remedying the issues associated with caller's leaving multiple voice messages regarding the same topic. The environment 100 includes a voicemail system 104 for receiving inbound telephone calls from a variety of callers 108a, 108b, ... 108n (generally 108). The voicemail system includes a call handling module 120, a voicemail module 136, a speech module 144, and an interactive voice response (IVR) module 140. The callers 108 initiate calls using any one of a variety of possible telephone devices 112a, 112b, ... 112n (generally 112) to dial in to the voicemail system 104. Calls are directed to a communication bus 142 of the call handling system 104 via one or more telecommunication networks 116a, 116b (generally 116). The telecommunication networks can be, for example, one or more voice over internet protocol (VOIP) networks or circuit switched networks.

Inbound calls received by the voicemail system 104 are first directed to a call handling module 120 to determine how to process the incoming call. Typically, the call handling module 120 receives a call and directs it to one of a plurality of agents 124a, ... 124m (generally 124). The call handling module 120 can direct an incoming call to a particular agent 124 if, for example, the caller knows the extension of the agent and enters the extension in response to a prompt issued by the call handling module 120. In some instances, the call handling module 120 instead places the incoming call into a caller queue 172 waiting for the next available agent 124. When an agent is available, the call handling module 120 directs the call to the now available agent 124. In instances where a call is directed to an agent 124, the agent 124 can receive the call at his/her terminal 128a, ... 128m (generally 128). In this implementation, the agent's terminal 128 is a computer that includes a telecommunication interface 132 and a headset that allows the agent to make calls, receive calls, and access other information associated with calls and voice messages stored in the voicemail system 104. In some embodiments, an agent can also access information about the caller and/or an organization with which the caller is associated. For example, if a caller has an account with the agent's company, the agent is able to access generalized account information for the caller's company.

The call handling module 120 may also give the caller 108 the opportunity to leave a message if no agents 124 are currently available. For example, the call handling module 120 may be configured to direct incoming calls to voicemail after normal business hours or at other times when agents 124 are not available. Calls directed to voicemail are transferred by the call handling module 120 to a voicemail module 136 and stored in a voicemail queue 174 in memory. The voicemail module 136 then acquires and stores data associated with the call in the voicemail queue 174 for subsequent retrieval or other processing. Typically, the data stored by the voicemail module 136 includes at least a voice message that is provided by the caller. However, a variety of types of data also can be, and is, stored by the system in various embodiments. The voicemail module 136 can acquire, for example, the caller's telephone number, some form of identification associated with the caller (e.g., a customer number), or the original number the caller dialed. This data can be acquired by the voicemail module 136 automatically in embodiments where the telecommunication network 116 already acquires this information for caller's making use of the respective network. For example, automatic number identification (ANI) capability is a feature of various telecommunication networks that may be accessed, in some cases, by the voicemail system 104 when a caller initiates a call.

In some embodiments, the voicemail module 136 provides a unique identifier to the caller 108 that is assigned by the voicemail system 104 to the data stored by the module 136. In some embodiments, the voicemail module 136 prompts the caller 108 to specify a desired unique identifier or a previously assigned unique identifier to be associated with a particular call and a corresponding voice message. Unique identifiers that can be used include, a customer account number previously assigned to the caller or the caller's company; a random, but, unique number assigned to the call; a number selected by the caller, or the caller's telephone number.

The voicemail system 104 also includes an optional interactive voice response (IVR) module 140 that allows callers to interact with the voicemail system 104 (e.g., the call handling module 120 and/or voicemail module) through the use of voice and keypad inputs using the caller's telephone device 112. The IVR module 140 responds to caller actions with prerecorded or dynamically generated audio providing information to the user (e.g., expected wait time until an agent will pick up the call or a unique identifier for the caller to reference in follow up communications) or requesting information from the call (e.g., unique identifier referencing a previous call/message or input from the caller asking how the caller would like to proceed).

The voicemail system 104 also includes an optional speech module 144 that converts the caller's voice message to a textual representation of the voice message. The speech module 144 identifies a language spoken by the caller and converts the voice message into a textual representation by recognizing the speech in the voice message. In some embodiments, the speech module 144 compares the spoken words to a database of stored words to identify what are the spoken words. In one embodiment, the speech module 144 selects a best candidate, from a list of possible candidates, as the textual representation to be used. The speech module 144 can use one or more language models to generate the textual representation. In some embodiments, the speech module 144 performs the conversion in real time. In some embodiments, the speech module 144 performs the conversion as a post-processing step after the caller has hung up. The textual representation of the voice message is included in the data that is acquired and stored by the voicemail module 136 that is made available to an agent when accessing the other data associated with the call.

In some instances, a caller may call back at a later time regarding the same issue. In these instances, the caller may have additional information regarding the issue or the caller's urgency in attending to the issue may have changed. Typically, the caller will leave a second message if offered the opportunity. The caller may be providing additional details or may just be expressing frustration that an agent has not yet returned a call in response to the first voice message. This creates multiple voice messages in the system which creates confusion and/or inefficiency for the agents in handling the caller's issue. For example, an agent listening to only the first voice message may lack additional information left by a caller in the second voice message. The technology described herein resolves these types of issues and also improves the overall experience of the caller.

Figure 2:
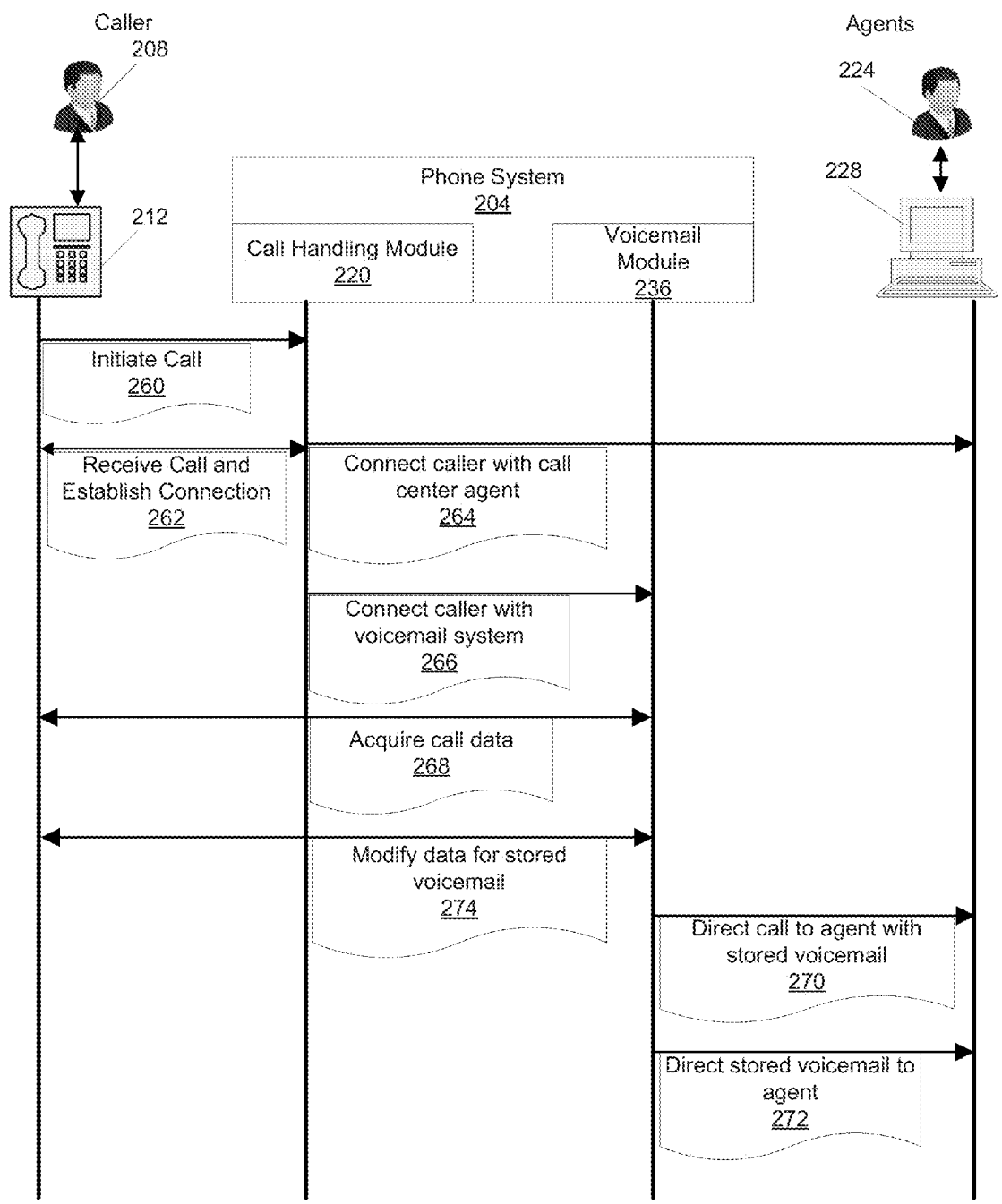
FIG. 2 is a diagram of a voicemail messaging process, according to an illustrative embodiment.

FIG. 2 is a diagram of a voicemail messaging process 200 incorporating the technology described herein, according to an illustrative embodiment. The process 200 begins with a caller 208 initiating a call (260) to a call center using a telephone 212 (e.g., calling a call center associated with the voicemail system 104 of FIG. 1). The call handling module 220 of the phone system 204 receives the call (262) and establishes the connection between the caller and the system 204. The call handling module 220 then connects (264) the caller with an agent 224 if an agent is available. The agent 224 receives the call at the agent's telecommunication terminal 228. In some embodiments, the call handling module 220 directs the caller to a particular requested agent 224, if specified by the caller 208. If no particular agent 224 is requested, the call handling module 220 connects the caller with an available agent 224 or holds the caller in a caller queue until an agent is available.

In instances where no agent 224 is available (e.g., it is a call received after normal business hours, or during a time when a high volume of inbound calls are received), the call handling module 220 connects (266) the caller with the voicemail module 236 of the phone system 204. Prior to prompting the user to provide a voice message, the voicemail module 236 identifies whether the call is associated with a call previously made, for which a voice message has already been stored in the system. The voicemail module 236 acquires data (268) for the call to determine if the call is related to a previously made call. The module 236 can acquire the data automatically by accessing certain types of data that is available to the module 236 (e.g., ANI caller data) and/or data that is provided by the caller (e.g., data that the caller provides in response to prompts from the module 236). In addition and/or alternatively, the module 236 can also ask the caller if the current call is associated with a stored message from a previous call. If the caller responds that it is, the module 236 initiates a set of process steps to determine which is the corresponding message stored in memory.

The types of data that can be acquired by the voicemail module 236 include, for example, a customer account number previously assigned to the caller or the caller's company; a number assigned to the earlier stored message that was provided to the caller during the previous call; a number selected by the caller, or the caller's telephone number. The voicemail module 236 then determines if the current call is related to a previous voice message stored in the system based on the data. The voicemail module 236 also identifies which is the specific voice message with which it is associated.

If the current call is related to a previously stored voice message, the module 236 can perform one or more of a variety of possible process steps. The module 236 can automatically decide which step to perform based on a set of defined rules and/or can prompt the user to specify what steps to take. For example, the module 236 can direct (270) the current call to an agent 224 along with the stored voice message. Alternatively, the module 236 can direct (272) the stored voice message to a different agent than to which the voice message was originally directed.

The module 236 also can modify (274) the data stored for the previously stored voice message if the new call is determined to be related to the previous call. In some embodiments, the phone system 204 is configured to provide the caller with particular options for modifying previously stored voice messages. For example, the module 236 can provide the caller with the option to delete the voice message associated with the previous call or alternatively append an additional voice message to the data associated with the previous call.

The module 236 also can take one or more actions if the module determines the new call is related to a previous call. In one embodiment, the module 236 performs one of the following steps: 1) direct the new call and the voice message associated with the previous call to an agent; 2) direct the voice message of the previous call to a different agent than to which the voice message of the previous call was originally directed; or 3) increase a priority level assigned to the voice message of the previous call (which would, for example, dictate that an agent should attend to the voice message more quickly than other voice messages in the voicemail queue).

If, however, the new call is not related to a call having a voice message previously stored, the system will acquire a new voice message. The voicemail module 236 also acquires (268) a variety of data associated with the inbound call, similarly as described previously herein. The data acquired can include, for example, a voice message provided by the user during the current call. The voice message is stored by the voicemail module 236 for subsequent retrieval in the voicemail system queue managed by the voicemail module 236. In addition, the data acquired also can include a unique identifier assigned to the stored voice message. The unique identifier can be used to distinguish between multiple voice messages stored in the system.

Figure 3:
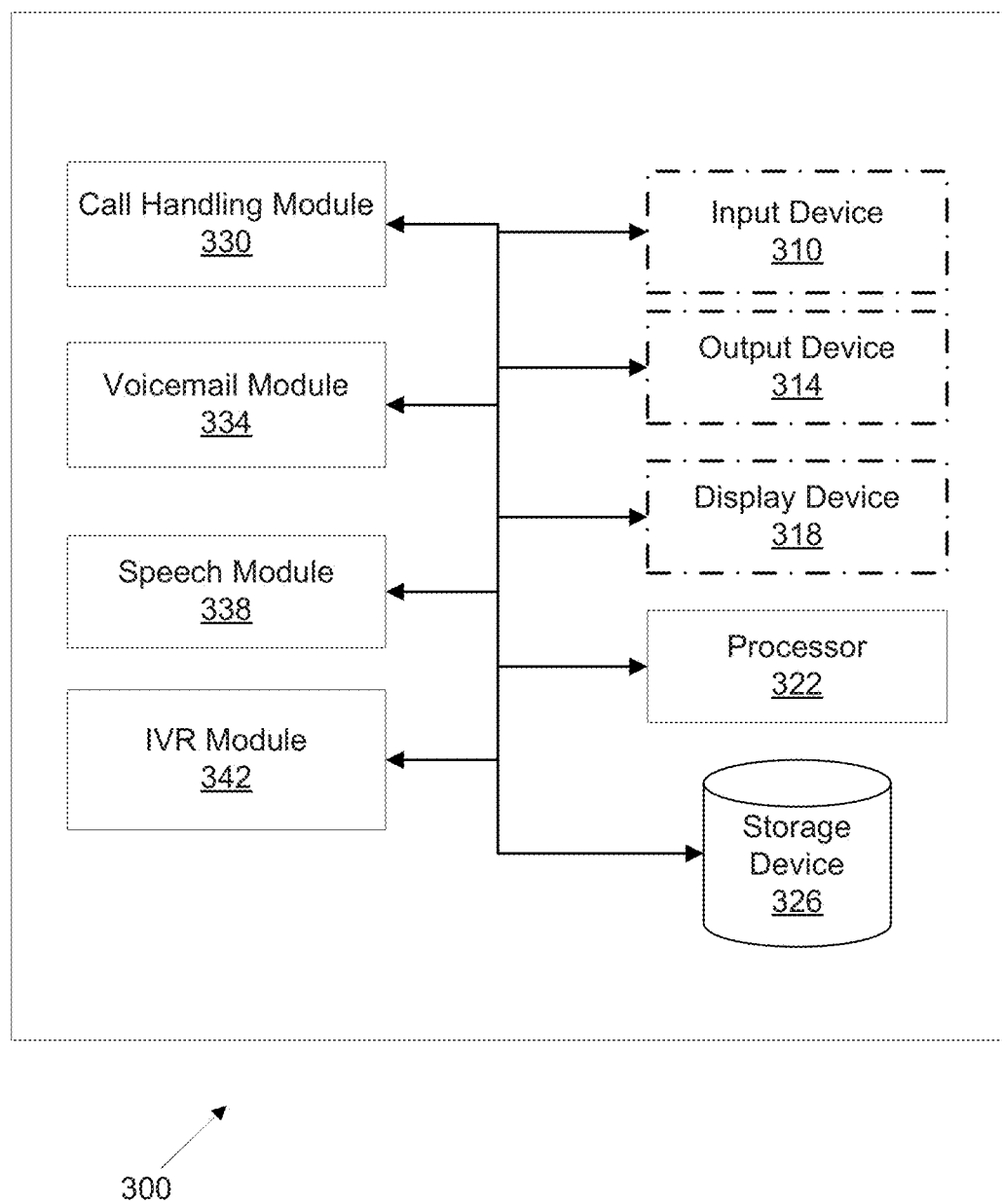
FIG. 3 is a schematic illustration of a voicemail system, according to an illustrative embodiment.

FIG. 3 is a schematic illustration of a voicemail system 300 (e.g., a voicemail system operated by a company with a call center). The voicemail system 300 includes a call handling module 330, a voicemail module 334, a speech module 338, an interactive voice response (IVR) module 342, an input device 310, an output device 314, a display device 318, a processor 322, and a storage device 326. Each of the modules can include a dedicated processor and memory for performing its functions. The input device 391, the output device 392, and the display device 393 are optional components of the voicemail system 300, but, can be used by, for example, a system administrator. The modules and devices described herein can, for example, utilize the processor 322 to execute computer executable instructions and/or the modules and devices described herein can, for example, include their own processor to execute computer executable instructions. It should be understood the voicemail system 300 can include, for example, other modules, devices, and/or processors known in the art and/or varieties of the illustrated modules, devices, and/or processors.

The call handling module 330 determines how to process an incoming call. Similarly as described previously herein regarding, for example, FIGS. 1 and 2, the call handling module 330 receives a call and directs it to one of a plurality of agents or to the voicemail module 334 based on how the caller responds to one or more prompts and/or based on call data acquired by the voicemail system 300. The voicemail module 334 acquires and stores data associated with the call for subsequent retrieval or other processing. Typically, the data stored by the voicemail module 334 includes, at least, a voice message that is provided by the caller. However, a variety of types of data also can be, and is, stored by the system in various embodiments. The voicemail module 334 can acquire, for example, the caller's telephone number, some form of identification associated with the caller, or the original number the caller dialed. This data can be used for a variety of uses, including determining if a new call is related to a previous call and/or a previously stored voice message.

The call handling module 330 also includes an interactive voice response module 342 that allows callers to interact with the voicemail system 300 through the use of voice and keypad inputs using a caller's telephone device, similarly as describe previously herein. The call handling module 330 also includes a speech module 338 that converts the caller's voice message to a textual representation of the voice message, similarly as describe previously herein.

The input device 310 receives information from a user (not shown) and/or another computing system (not shown). The input device 310 can include, for example, a keyboard and/or a scanner. In some embodiments, a system administrator accesses the voicemail system 300 via the input device 310. The output device 314 outputs information associated with the voicemail system 300 (e.g., information to a printer (not shown), information to a speaker). The display device 318 displays information associated with the voicemail system 300 (e.g., status information, configuration information, graphical representations of the system's operation). The processor 322 executes the operating system and/or any other computer executable instructions for the voicemail system 300 (e.g., executes applications). The storage device 326 stores a variety of information/data, including configuration information and/or voice messages and call data. The storage device 326 can include a plurality of storage devices and/or the voicemail system 300 can include a plurality of storage devices (e.g., a call configuration storage device, a voice message storage device). The storage device 326 can include, for example, long-term storage (e.g., a hard drive, a tape storage device, flash memory), short-term storage (e.g., a random access memory, a graphics memory), and/or any other type of computer readable storage.

Figure 4:
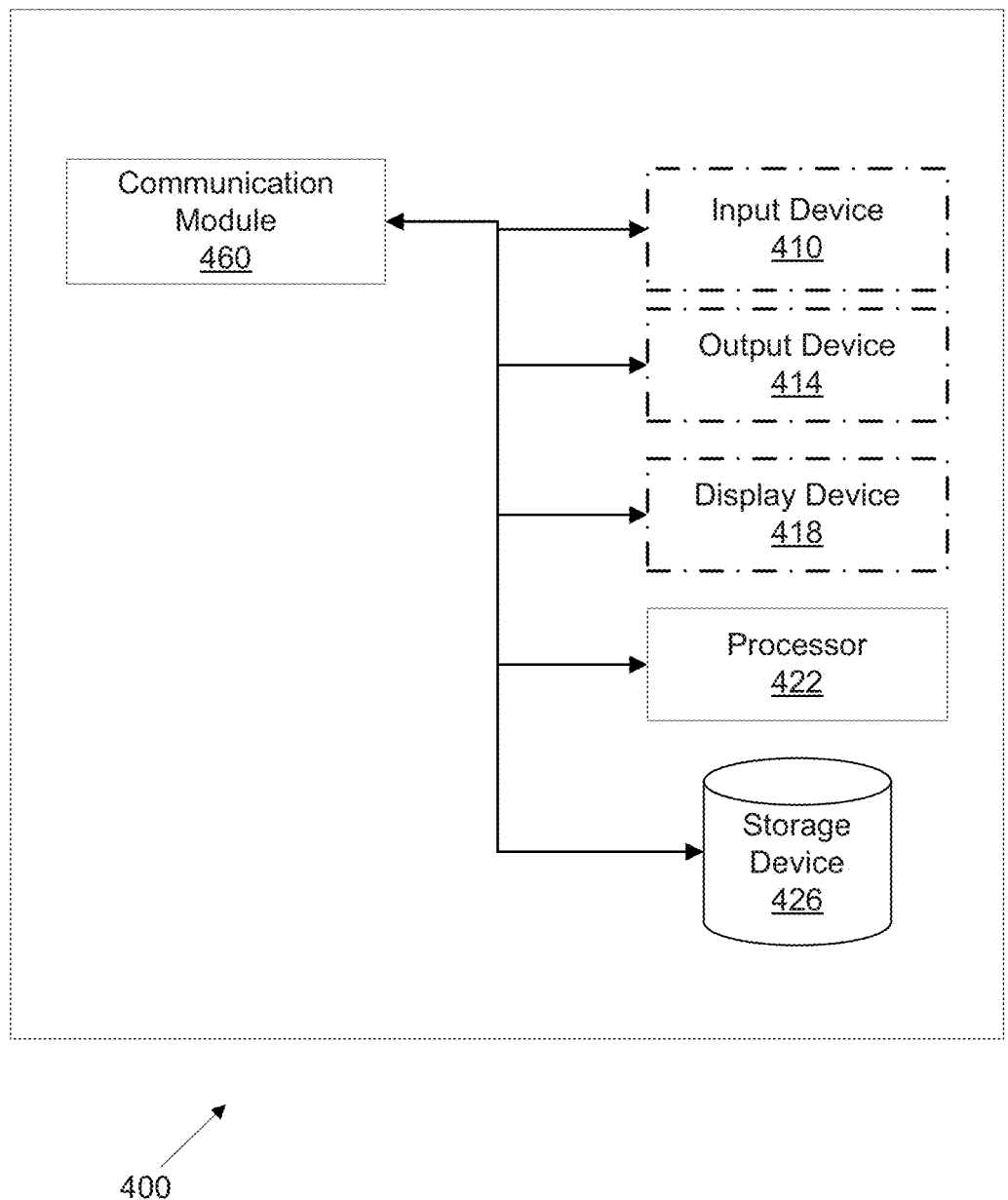
FIG. 4 is a schematic illustration of a telecommunication terminal, according to an illustrative embodiment.

FIG. 4 is a schematic illustration of a telecommunication terminal 400 (e.g., a terminal used by an agent to speak with callers and/or respond to caller voice messages). The terminal 400 includes a communication module 460, an input device 410, an output device 414, a display device 418, a processor 422, and a storage device 426. The modules and devices described herein can, for example, utilize the processor 422 to execute computer executable instructions and/or the modules and devices described herein can, for example, include their own processor to execute computer executable instructions.

It should be understood the terminal 400 can include, for example, other modules, devices, and/or processors known in the art and/or varieties of the illustrated modules, devices, and/or processors. In this implementation, the terminal 400 includes a telecommunication interface (e.g., interface 132 of FIG. 1) and a headset that allows the agent to make calls, receive calls, and access other information associated with calls and voice messages stored in a voicemail system (e.g., voicemail system 104 of FIG. 1). In some embodiments, an agent can also access information about the caller and/or an organization with which the caller is associated. For example, if a caller has an account with the agent's company, the agent is able to access generalized account information for the caller's company.

The terminal 400 includes a communication module 460 that enables the terminal 400 to communicate with a communication bus of the call handling system (e.g., communication bus 142 of FIG. 1). The input device 410 receives information from a user/agent (not shown) and/or another computing system (not shown). The input device 410 can include, for example, a keyboard, mouse and/or a scanner. The agent is able to search for and access information using the input device. For example, the agent can select a voice message stored in the system to be played so the agent can then determine what action should be taken. The output device 414 outputs information associated with the terminal 400 (e.g., information to a printer, information to a speaker, information to a display monitor).

The display device 318 displays information associated with the terminal 400 (e.g., status information for calls in a caller queue, or information/data for voice messages in a queue). The processor 422 executes the operating system and/or any other computer executable instructions for the terminal 400 (e.g., executes applications). The storage device 426 stores a variety of information/data, including call data and related information. The storage device 426 can include a plurality of storage devices and/or the terminal 400 can include a plurality of storage devices. The storage device 426 can include, for example, long-term storage (e.g., a hard drive, a tape storage device, flash memory), short-term storage (e.g., a random access memory, a graphics memory), and/or any other type of computer readable storage.

Figure 5:
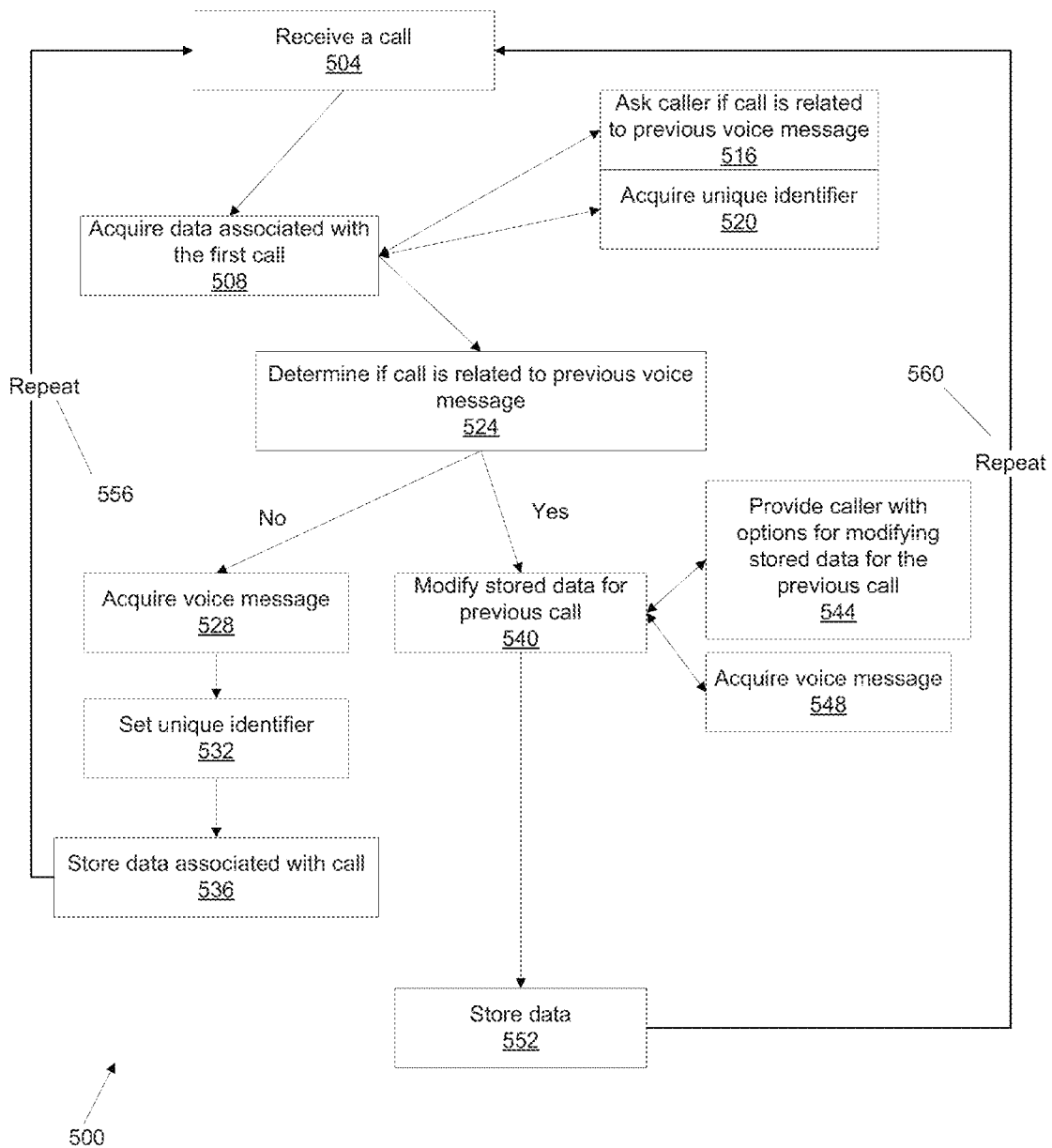
FIG. 5 is a flowchart of a method for modifying voice messages in a voicemail system, according to an illustrative embodiment.

FIG. 5 is a flowchart 500 of a method illustrating how voice messages can be modified using, for example, the voicemail system 104 of FIG. 1. The call handling module 120 receives a call (504) from a user. The voicemail system 104 then acquires data (508) associated with the first call. In this embodiment, the voicemail system 104 asks the caller (516) whether the call relates to a voice message previously provided to the voicemail system 104. If the caller provides an indication the call is related to a previously stored voice message (by, for example, answering "yes" to the question), the system also acquires (520) the unique identifier (e.g., customer number) for the previously stored voice message. The voicemail system 104 then determines (524) if the call is actually related to a previous voice message stored in the system 104. The system 104 can accomplish this by comparing the unique identifier with the identifiers associated with stored voice messages.

If the current call is not related to a previous voice message, the voicemail system 104 acquires a voice message (528) from the caller and then sets a unique identifier (532) for the current call. The voicemail system 104 can set a unique identifier by, for example, asking the caller to input its customer number. The voicemail system 104 then stores (536) the data (at least, the voice message and unique identifier) associated with the call. The voicemail system 104 is continually operating and therefore repeats (556) the steps of the method, and waits for a new call.

If, instead, the current call is related to a previous voice message, the voicemail system 104 modifies the stored data (540) for the previous call. The voicemail system 104 can provide the caller with options for modifying the stored data for the previous call, including acquiring a voice message (548) from the caller. Options that can be provided to the caller include, for example, deleting the voice message from the previous call or appending an additional voice message to the data associated with the first call. In some embodiments, the new voice message can be stored along with, but as a separate voice message in, the call data acquired by the voicemail system 104. After the data has been modified, the voicemail system 104 stores the modified data (552). The voicemail system 104 is continually operating and therefore repeats (560) the steps of the method, and waits for a new call.

The above-described systems and methods can be implemented in digital electronic circuitry, in computer hardware, firmware, and/or software. The implementation can be as a computer program product that is tangibly embodied in an information carrier. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic, magneto-optical disks, or optical disks are examples of such storage devices.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, a mouse or a trackball, by which the user can provide input to the computer to interact with a user interface element. Other kinds of devices can be used to provide for interaction with a user. Other devices can, for example, be feedback provided to the user in any form of sensory feedback, visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication or communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, such as a local area network (LAN), wide area network (WAN), campus area network (CAN), metropolitan area network (MAN), or home area network (HAN). Networks can also include a private IP network, an IP private branch exchange (IPBX), a wireless network, and/or other packet-based networks. Circuit-based networks can include, for example, the public switched telephone network (PSTN), a private branch exchange (PBX), a wireless network, such as RAN, bluetooth, code-division multiple access (CDMA) network, time division multiple access (TDMA) network, or the global system for mobile communications (GSM) network, and/or other circuit-based networks.

The computing device can include, for example, a computer, a computer with a browser device, a telephone, an IP phone, a mobile device, and/or other communication devices. Mobile devices can include a cellular phone, personal digital assistant (PDA) device, laptop computer, or electronic mail device. The browser device includes, for example, a computer with a world wide web browser, such as the Chrome browser available from Google Inc. or the Mozilla® Firefox browser available from Mozilla Corporation). The mobile computing device includes, for example, an Android-based smart phone.

Comprise, include, and/or plural forms of each are open ended and include the listed parts and can include additional parts that are not listed. And/or is open ended and includes one or more of the listed parts and combinations of the listed parts.

One skilled in the art will realize the disclosure may be embodied in other specific forms without departing from the spirit or essential characteristics thereof. The foregoing implementations are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

The invention claimed is:

1. A voicemail system, comprising:
one or more processors; and
a memory, the memory including executable code representing instructions that when executed cause the system to:
receive a first call;
acquire data associated with the first call, the data including:
a voice message provided during the first call, the voice message stored for subsequent retrieval in a voicemail system queue with one or more additional voice messages, and
a unique identifier assigned to the stored voice message of the first call;
receive a second call;
acquire data for the second call, the data including information the system uses to determine whether the second call relates to a voice message previously provided to the voicemail system;
determine that the second call is related to the first call based on a comparison of at least a portion of the data for the second call and at least a portion of the data for the first call; and
modify the stored data associated with the first call,
wherein the memory includes code representing instructions that when executed cause the system to ask the second call caller to input the unique identifier of a previously stored voice message if the second call caller provides an indication that the second call relates to a voice message previously provided to the voicemail system.

2. The system of claim 1, wherein the memory includes code representing instructions that when executed cause the system to provide the second call caller with options for modifying the stored data associated with the first call if the unique identifier input by the second call caller matches the unique identifier assigned to the stored voice message of the first call.

3. The system of claim 2, wherein the memory includes code representing instructions that when executed cause the system to provide the second caller with one or more of the following options to modify the stored data associated with the first call:
delete voice message for the first call; or
append an additional voice message to the data associated with the first call.

4. A voicemail system, comprising:
one or more processors; and
a memory, the memory including executable code representing instructions that when executed cause the system to:
receive a first call;
acquire data associated with the first call, the data including:
a voice message provided during the first call, the voice message stored for subsequent retrieval in a voicemail system queue with one or more additional voice messages, and
a unique identifier assigned to the stored voice message of the first call;
receive a second call;
acquire data for the second call, the data including information the system uses to determine whether the second call relates to a voice message previously provided to the voicemail system, wherein acquiring data for the second call includes acquiring caller identification data associated with the second call caller and asking the second call caller to provide an indication of whether the second call relates to a stored voice message;
determine that the second call is related to the first call based on a comparison of at least a portion of the data for the second call and at least a portion of the data for the first call; and
modify the stored data associated with the first call.

5. The system of claim 4, wherein the memory includes code representing instructions that when executed cause the system to provide the second call caller with options for modifying the stored data associated with the first call if the caller identification data associated with the second call matches caller identification data associated with the first call.

6. A voicemail system, comprising:
one or more processors; and
a memory, the memory including executable code representing instructions that when executed cause the system to:
receive a first call;
acquire data associated with the first call, the data including:
a voice message provided during the first call, the voice message stored for subsequent retrieval in a voicemail system queue with one or more additional voice messages, and
a unique identifier assigned to the stored voice message of the first call;
receive a second call;
acquire data for the second call, the data including information the system uses to determine whether the second call relates to a voice message previously provided to the voicemail system;
determine that the second call is related to the first call based on a comparison of at least a portion of the data for the second call and at least a portion of the data for the first call; and
modify the stored data associated with the first call,
wherein the memory includes code representing instructions that when executed cause the system to perform one or more of the following actions if the second call is determined to be related to the first call:
direct the second call and the voice message to an agent;
direct the voice message of the first call to a different agent than the voice message of the first call was originally directed, or
increase a priority level assigned to the voice message of the first call.

7. A voicemail system, comprising:
one or more processors; and
a memory, the memory including executable code representing instructions that when executed cause the system to:
receive a first call;
acquire data associated with the first call, the data including:
a voice message provided during the first call, the voice message stored for subsequent retrieval in a voicemail system queue with one or more additional voice messages, and
a unique identifier assigned to the stored voice message of the first call;
receive a second call;
acquire data for the second call, the data including information the system uses to determine whether the second call relates to a voice message previously provided to the voicemail system;
determine that the second call is related to the first call based on a comparison of at least a portion of the data for the second call and at least a portion of the data for the first call; and
modify the stored data associated with the first call,
wherein the memory includes code representing instructions that when executed cause the system to direct the second call to an agent, direct the second call to a caller queue, or acquire data associated with the second call if the second call caller provides an indication the second call is not related to a voice message previously provided to the voicemail system.

8. The system of claim 7, wherein the data associated with the second call includes:
a voice message provided during the second call, the voice message stored for subsequent retrieval in the voicemail system queue with one or more additional voice messages, and
a unique identifier assigned to the stored voice message of the second call.

9. A computer implemented method for modifying voice messages located in a voicemail system queue, the method comprising:
receiving a first call;
acquiring data associated with the first call, the data including:

a voice message provided during the first call, the voice message stored for subsequent retrieval in a voicemail system queue with one or more additional voice messages, and a unique identifier assigned to the stored voice message of the first call;

receiving a second call;

acquiring data for the second call, the data including information used to determine whether the second call relates to a voice message previously provided to the voicemail system;

determining that the second call is related to the first call based on a comparison of at least a portion of the data for the second call and at least a portion of the data for the first call;

modifying the stored data associated with the first call; and asking the second call caller to input the unique identifier of a previously stored voice message if the second call caller provides an indication that the second call relates to a voice message previously provided to the voicemail system.

10. The method of claim 9, comprising providing the second call caller with options for modifying the stored data associated with the first call if the unique identifier input by the second call caller matches the unique identifier assigned to the stored voice message of the first call.

11. The method of claim 9, comprising providing the second caller with one or more of the following options to modify the stored data associated with the first call:

delete voice message for the first call; or append an additional voice message to the data associated with the first call.

12. The method of claim 9, wherein the data acquired that is associated with the first call includes one or more of the following: the first call caller telephone number, a caller identification associated with the first call caller, a textual representation of the voice message of the first call.

13. A computer implemented method for modifying voice messages located in a voicemail system queue, the method comprising:

receiving a first call;

acquiring data associated with the first call, the data including:

a voice message provided during the first call, the voice message stored for subsequent retrieval in a voicemail system queue with one or more additional voice messages, and a unique identifier assigned to the stored voice message of the first call;

receiving a second call;

acquiring data for the second call, the data including information used to determine whether the second call relates to a voice message previously provided to the voicemail system, wherein acquiring data for the second call includes acquiring caller identification data associated with the second call caller and the method further comprising asking the second call caller to provide an indication of whether the second call relates to a stored voice message;

determining that the second call is related to the first call based on a comparison of at least a portion of the data for the second call and at least a portion of the data for the first call; and modifying the stored data associated with the first call.

14. The method of claim 13, comprising providing the second call caller with options for modifying the stored data associated with the first call if the caller identification data associated with the second call matches caller identification data associated with the first call.

15. A computer implemented method for modifying voice messages located in a voicemail system queue, the method comprising:

receiving a first call;

acquiring data associated with the first call, the data including:

a voice message provided during the first call, the voice message stored for subsequent retrieval in a voicemail system queue with one or more additional voice messages, and a unique identifier assigned to the stored voice message of the first call;

receiving a second call;

acquiring data for the second call, the data including information used to determine whether the second call relates to a voice message previously provided to the voicemail system;

determining that the second call is related to the first call based on a comparison of at least a portion of the data for the second call and at least a portion of the data for the first call;

modifying the stored data associated with the first call; and performing one or more of the following actions if the second call is determined to be related to the first call:

direct the second call and the voice message to an agent;

direct the voice message of the first call to a different agent that the voice message of the first call was originally directed, or increase a priority level assigned to the voice message of the first call.

16. A computer implemented method for modifying voice messages located in a voicemail system queue, the method comprising:

receiving a first call;

acquiring data associated with the first call, the data including:

a voice message provided during the first call, the voice message stored for subsequent retrieval in a voicemail system queue with one or more additional voice messages, and a unique identifier assigned to the stored voice message of the first call;

receiving a second call;

acquiring data for the second call, the data including information used to determine whether the second call relates to a voice message previously provided to the voicemail system;

determining that the second call is related to the first call based on a comparison of at least a portion of the data for the second call and at least a portion of the data for the first call;

modifying the stored data associated with the first call; and directing the second call to an agent, directing the second call to a caller queue, or acquiring data associated with the second call if the second call caller provides an indication the second call is not related to a voice message previously provided to the voicemail system.

17. The method of claim 16, wherein the data associated with the second call includes:

a voice message provided during the second call, the voice message stored for subsequent retrieval in the voicemail system queue with one or more additional voice messages, and a unique identifier assigned to the stored voice message of the second call.

\* \* \* \* \*